(12) United States Patent
Nagai et al.

(10) Patent No.: US 11,461,641 B2
(45) Date of Patent: Oct. 4, 2022

(54) INFORMATION PROCESSING APPARATUS, INFORMATION PROCESSING METHOD, AND COMPUTER-READABLE STORAGE MEDIUM

(71) Applicant: KDDI CORPORATION, Tokyo (JP)

(72) Inventors: Yuki Nagai, Fujimino (JP); Tatsuya Kobayashi, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 668 days.

(21) Appl. No.: 16/532,812

(22) Filed: Aug. 6, 2019

(65) Prior Publication Data

US 2019/0362232 A1 Nov. 28, 2019

Related U.S. Application Data

(63) Continuation of application No. PCT/JP2018/008445, filed on Mar. 6, 2018.

(30) Foreign Application Priority Data

Mar. 31, 2017 (JP) .............................. JP2017-071874

(51) Int. Cl.
*G06N 3/08* (2006.01)
(52) U.S. Cl.
CPC ..................... *G06N 3/08* (2013.01)
(58) Field of Classification Search
CPC ........................................................ G06N 3/08
See application file for complete search history.

(56) References Cited

U.S. PATENT DOCUMENTS 6,438,493 B1 * 8/2002 West .................. G01V 1/32
703/5
6,560,540 B2 * 5/2003 West .................. G01V 1/32
702/14

(Continued)

FOREIGN PATENT DOCUMENTS

WO 2016/043734 A1 3/2016
WO 2018/180263 A1 10/2018

OTHER PUBLICATIONS

Extended European Search Report for European Patent Application No. 18776622.5 dated Mar. 16, 2020.

(Continued)

*Primary Examiner* — Viral S Lakhia
(74) *Attorney, Agent, or Firm* — Thomas | Horstemeyer, LLP

(57) ABSTRACT

An information processing apparatus includes a weight setting unit configured to set a plurality of weights of a selection layer selected from a plurality of layers of a first neural network as a plurality of weights of a second neural network; a classification unit configured to classify each of the weights of the selection layer into a first group or a second group; a first determination unit configured to determine a first gradient for each weight of the first neural network, based on first training data; a second determination unit configured to determine a second gradient for weights belonging to the first group based on second training data; and an updating unit configured to update the weights belonging to the first group based on the first gradient and the second gradient, and updating the other weights based on the first gradient.

6 Claims, 10 Drawing Sheets

(56) References Cited

U.S. PATENT DOCUMENTS

| | | | | |
|---|---|---|---|---|
| 6,662,112 | B2* | 12/2003 | Eastwood | G01V 1/34 |
| | | | | 702/14 |
| 9,373,059 | B1* | 6/2016 | Heifets | G06V 10/42 |
| 10,380,483 | B2* | 8/2019 | Lee | G06N 3/0445 |
| 10,546,237 | B2* | 1/2020 | Heifets | G16B 40/00 |
| 10,922,604 | B2* | 2/2021 | Zhao | G06N 3/084 |
| 11,017,019 | B1* | 5/2021 | Hohwald | G06F 16/24578 |
| 2017/0206449 | A1 | 7/2017 | Lain | |
| 2017/0212829 | A1* | 7/2017 | Bales | G06N 3/0454 |
| 2018/0075347 | A1* | 3/2018 | Alistarh | G06N 3/084 |
| 2021/0295166 | A1* | 9/2021 | Rouhani | G06N 3/0454 |

OTHER PUBLICATIONS

Uchida et al.: "Embedding Watermarks into Deep Neural Networks", arXiv.org, Cornell University Library, 201 Olin Library Cornell University Ithaca, NY 14853, Jan. 15, 2017, XP081275035.
International Search Report for PCT/JP2018/008445 dated May 22, 2018 (partially translated).
Yangqing et al., Caffe: Convolutional Architecture for Fast Feature Embedding, in Proceedings of the 22nd ACM International Conference on Multimedia (pp. 675-678), ACM, Jun. 20, 2014.

* cited by examiner

INFORMATION PROCESSING APPARATUS, INFORMATION PROCESSING METHOD, AND COMPUTER-READABLE STORAGE MEDIUM

CROSS-REFERENCE TO RELATED APPLICATIONS

This application is a continuation of International Patent Application No. PCT/JP2018/008445 filed on Mar. 6, 2018, which claims priority to and the benefit of Japanese Patent Application No. 2017-071874 filed on Mar. 31, 2017, the entire disclosures of which are incorporated herein by reference.

TECHNICAL FIELD

The present invention relates to an information processing apparatus, an information processing method, and a computer-readable storage medium.

BACKGROUND ART

Recent years have seen improved CPU (Central Processing Unit) and GPU (Graphics Processing Unit) speed, increased memory capacity, and rapid advances in machine learning technology. Machine learning using learning data in the order of hundreds of thousands to millions of data thus becomes possible, and high-precision identification technology and classification technology are becoming established (see Non-patent Literature 1).

CITATION LIST

Non-Patent Literature

NPTL 1: Yangqing Jia, Evan Shelhamer, Jeff Donahue, Sergey Karayev, Jonathan Long, Ross Girshick, Sergio Guadarrama, and Trevor Darrell. Caffe: Convolutional architecture for fast feature embedding. In Proceedings of the 22nd ACM international conference on Multimedia (pp. 675-678). ACM.

SUMMARY OF INVENTION

Technical Problem

Performing machine learning based on large amounts of learning data entails large calculation costs. Also, preparing large amounts of learning data and preprocessing for processing prepared learning data for use in machine learning requires a huge amount of work. On the other hand, a learning model generated by machine learning is digital data, and easy to copy. Furthermore, it is generally difficult to infer learning data used in learning model generation from the learning model itself.

Thus, even if a learning model is utilized in an improper manner by a third party, those who generated the learning model will have difficulty proving the impropriety. Collected learning data and learning models generated based on learning data have value acquired through the respective work involved, and it is desired to protect learning models from improper utilization.

Solution to Problem

According to one aspect of the present invention, an information processing apparatus includes: a weight setting unit configured to set a plurality of weights of a selection layer selected from a plurality of layers of a first neural network as a plurality of weights of a second neural network; a classification unit configured to classify each of the plurality of weights of the selection layer into a first group or a second group; a first determination unit configured to determine a first gradient for each weight of the plurality of layers of the first neural network, based on first training data; a second determination unit configured to determine a second gradient for weights belonging to the first group among the plurality of weights of the second neural network, based on second training data; and an updating unit configured to update the weights belonging to the first group, among the plurality of weights of the selection layer, based on the first gradient determined by the first determination unit and the second gradient determined by the second determination unit, and updating the weights belonging to the second group, among the plurality of weights of the selection layer, and weights of the layers other than the selection layer among the plurality of layers of the first neural network, based on the first gradient determined by the first determination unit.

Advantageous Effects of Invention

According to the present invention, the origin of a neural network can be specified.

Other features and advantages of the present invention will be apparent from the following description taken in conjunction with the accompanying drawings. Note that the same reference numerals denote the same or like components throughout the accompanying drawings.

DESCRIPTION OF EMBODIMENTS

Convolutional Neural Network

An information processing apparatus according to an embodiment is an apparatus for embedding watermark information in a model parameter of a neural network (NN).

Hereinafter, description of the embodiment will be given, with a convolutional neural network (CNN) serving as the neural network. First, a convolutional neural network will be described briefly.

Figure 1:
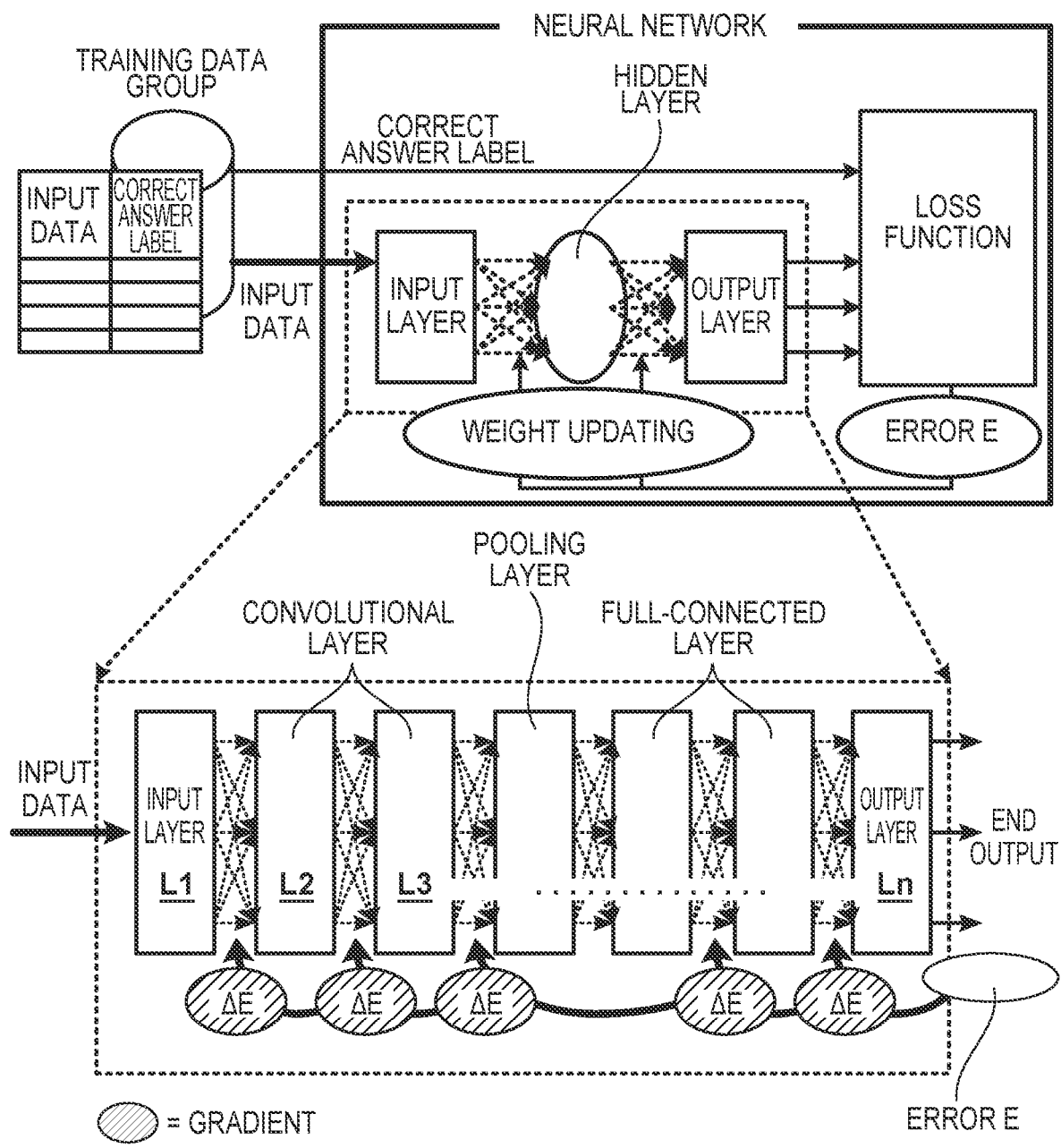
FIG. 1 is a diagram showing a general functional configuration of a convolutional neural network.

FIG. 1 is a diagram showing a general functional configuration of a convolutional neural network. Although neural networks having various configurations have currently been proposed, they share the same basic configuration. A basic configuration of a neural network is represented by the superposition (or graph structure) of a plurality of types of layers. The neural network learns the model parameter such that the output result with respect to input data will be an appropriate value. In other words, the neural network learns the model parameter such that a loss function defined such that output result with respect to input data will be an appropriate value is minimized.

In FIG. 1, a feedforward neural network is constituted by three layers consisting of an input layer, a hidden layer and an output layer, and input data is propagated in one direction from the input layer toward the output layer. The hidden layer can be constituted by a plurality of graph-like layers. Each layer has a plurality of units (neurons). In each layer, parameters that are applied to an input value from a unit of a forward layer to a unit of a backward layer are referred to as "weights". Learning in this specification involves calculating appropriate "weights".

FIG. 1 shows a convolutional neural network. The convolutional neural network is constituted by an input layer, convolutional layers, a pooling layer, full-connected layers, and an output layer. In FIG. 1, a first layer L1 is the input layer and a second layer L2 is a convolutional layer. Similarly, an n-th layer Ln is the output layer.

Learning in the neural network according to the embodiment involves updating the weights of each layer to optimal weights, using the error between the output value of the output layer with respect to input data which is training data and a correct answer label (hereinafter, simply "label") corresponding to the input data. A "loss function" is defined in order to calculate this error. Errors are successively propagated from the output layer toward the input layer through "error backpropagation", and the weights of the respective layers are gradually updated. Finally, a convergent calculation that adjusts the weights of the respective layers to appropriate values is executed, such that the error decreases. Specifically, in learning (i.e., stage of generating a new model parameter) in the neural network, the model parameter is updated, using a gradient obtained by backpropagating the error.

Figure 2:
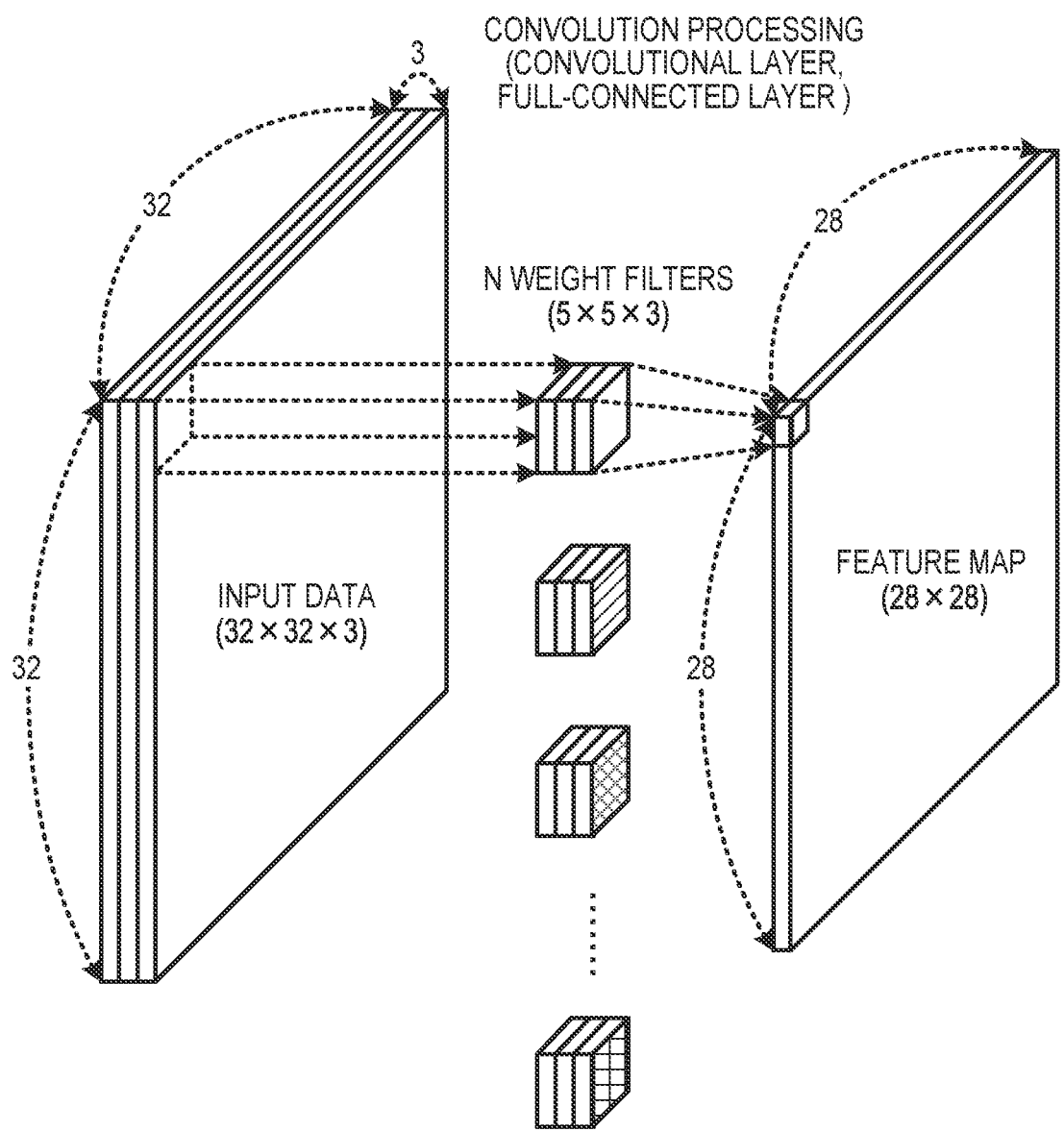
FIG. 2 is a diagram for describing a convolutional relationship between input data and a feature map.

FIG. 2 is a diagram for describing a convolutional relationship between input data and a feature map. The processing in FIG. 2 is executed using the convolutional layers and the full-connected layers. In the example shown in FIG. 2, one feature map is generated by applying one weight filter to the input data. In FIG. 2, the respective sizes of the input data, the weight filter and the feature map are as follows:
  Input data: 32×32×3 elements
  Weight filter: 5×5×3 elements (model parameter)
  Feature map: 28×28 elements N weight filters are prepared (where N is an integer of 1 or more), and serve as the model parameter. That is, "weight" means the respective weights of the N weight filters (values of the elements of the filters). Bias items are, however, not taken into consideration here.

Figure 3:
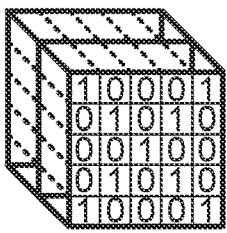
FIG. 3 is a diagram for describing generation of a feature map that uses weight filters.
Figure 3:
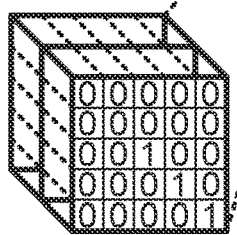
Figure 3:
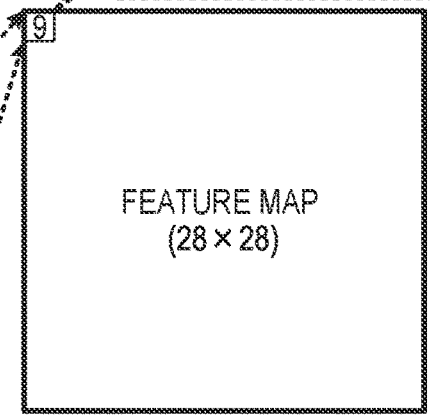
Figure 3:
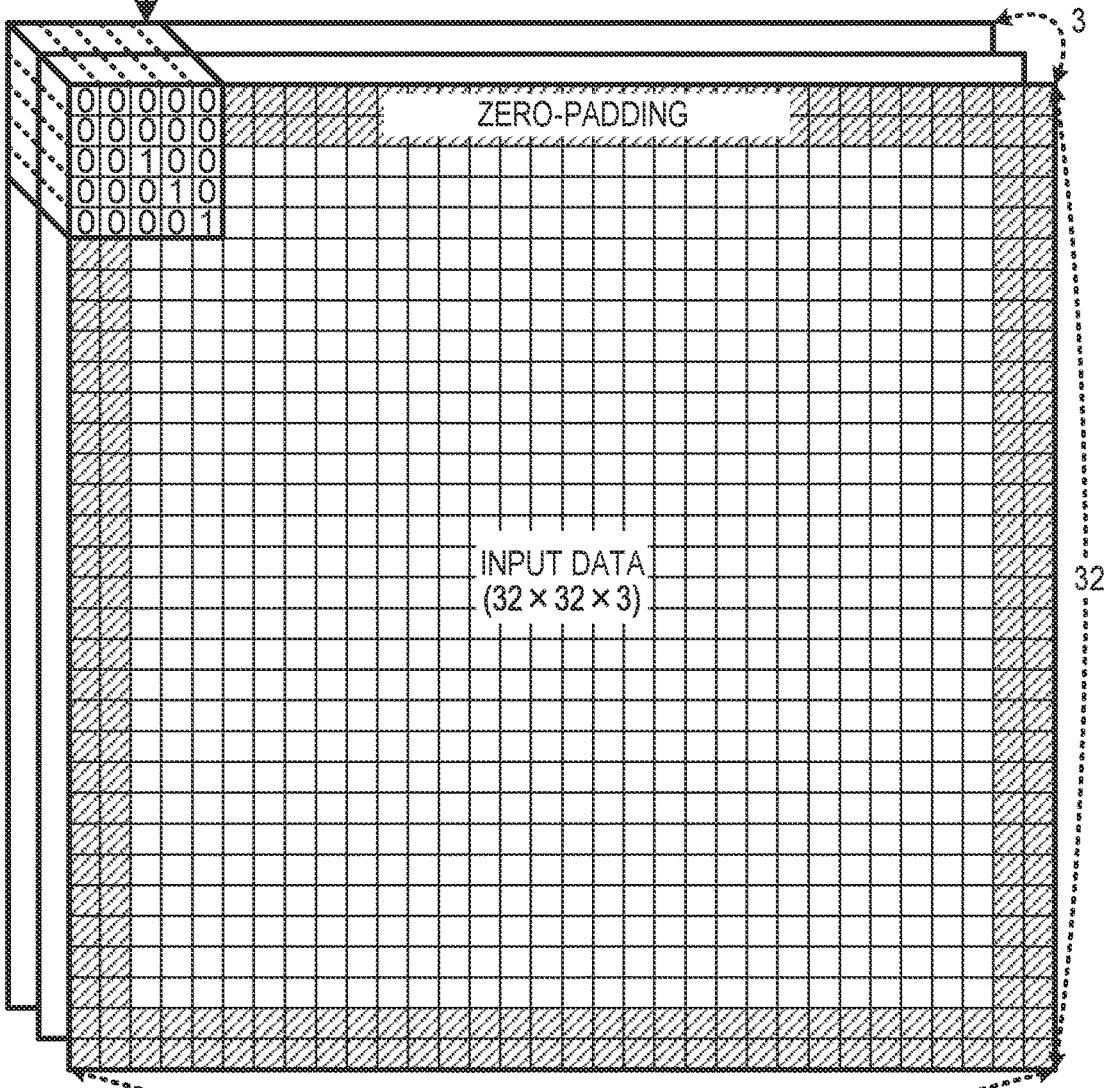

FIG. 3 is a diagram for describing generation of a feature map that uses a weight filter. In the example shown in FIG. 3, one weight filter composed of 5×5×3 elements is applied to input data, and the sum of the products of respective elements is set as the value of one element of the feature map. One feature map is generated, by moving the same weight filter relative to the input data. Here, the number of the elements that the weight filter is moved (movement amount) is referred to as a "stride". A zero-padding region filled with elements 0 is provided on the peripheral edge of the input data. Weight filters having the same number of elements can thereby also be applied to elements on the edge of the input data.

Figure 4:
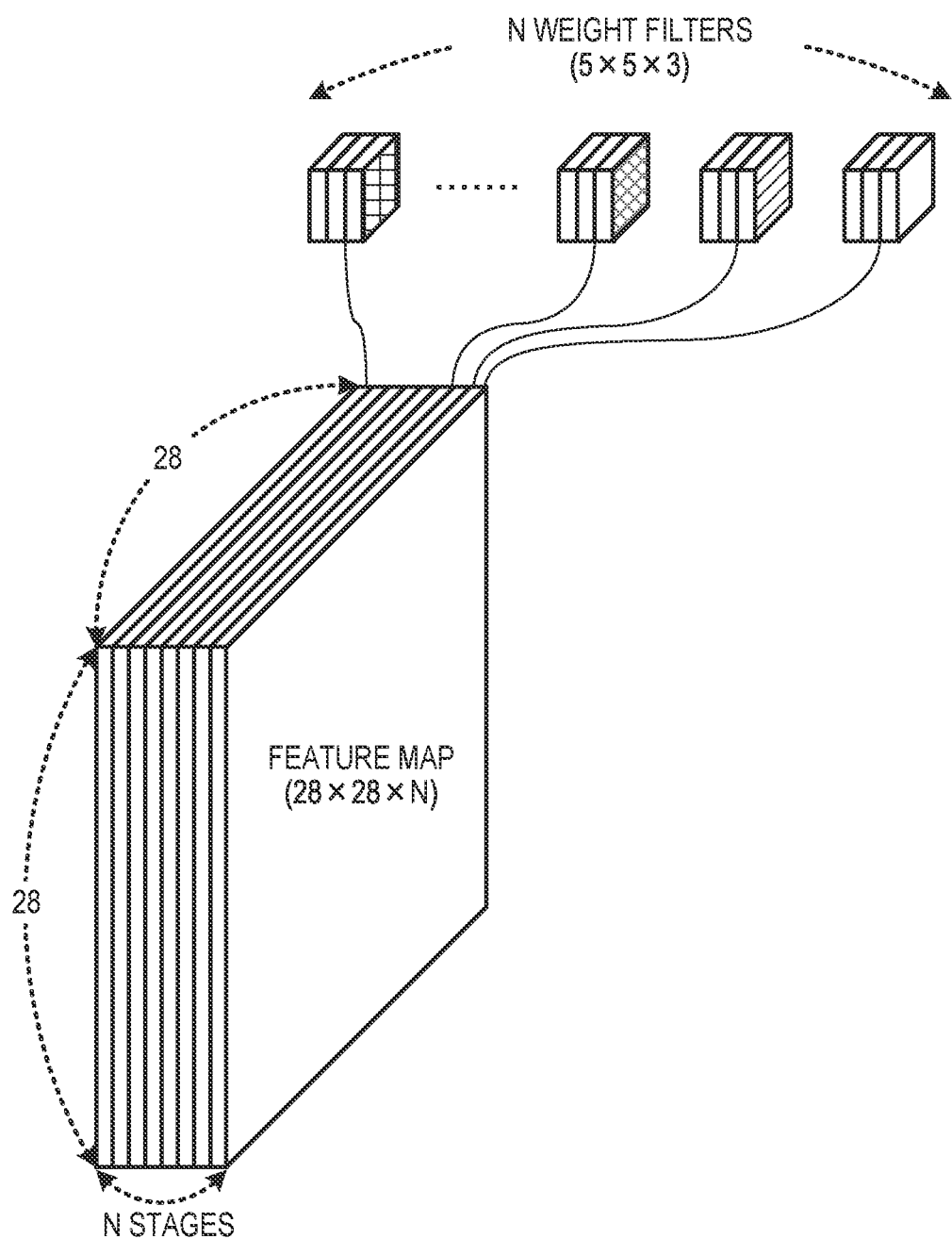
FIG. 4 is a diagram for describing a relationship between N weight filters and an N-stage feature map.

FIG. 4 is a diagram for describing a relationship between N weight filters and an N-stage feature map. In the example shown in FIG. 4, the number of weight filters is N. FIGS. 2 and 3 show one feature map being generated using one weight filter. In contrast, the example in FIG. 4 shows an N-stage feature map being generated using N weight filters. In learning by a neural network, the feature map of one layer serves as the input data of the next layer. As a result of executing learning by a neural network, errors based on a loss function propagate successively from the output layer toward the input layer, and the weight of each layer is updated using a known error backpropagation method.

Summary of Embodiment

A summary of the embodiment will now be described, premised on the above. An information processing apparatus according to the embodiment is an apparatus for generating a learning model for achieving an object task using a neural network, and, at the same time, embedding an electronic watermark in the learning model.

The information processing apparatus according to the embodiment is constituted by a processor such as CPU or GPU, a work memory such as DRAM (Dynamic Random Access Memory), and a mass storage device such as an HDD (Hard Disk Drive) or an SSD (Solid State Drive). The information processing apparatus may be a single apparatus such as PC (Personal Computer), a workstation or a server, or may be constituted by a plurality of apparatuses as with a cloud server.

Figure 5:
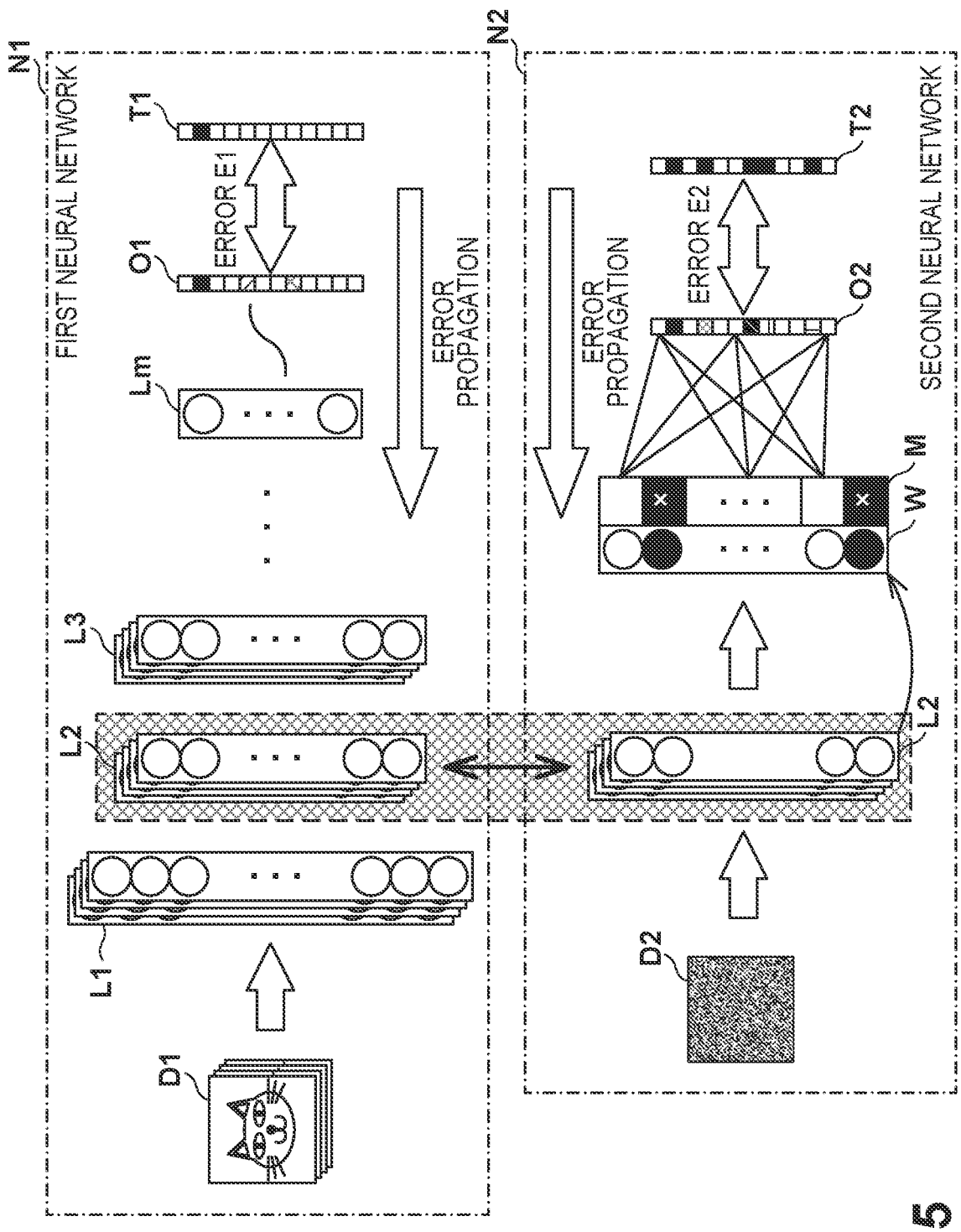
FIG. 5 is a diagram for describing a summary of learning processing that is executed by an information processing apparatus according to an embodiment.

FIG. 5 is a schematic diagram for describing a summary of learning processing that is executed by the information processing apparatus according to the embodiment. The information processing apparatus according to the embodiment derives a gradient (hereinafter, first gradient) for each weight of each layer L of a first neural network N1 provided with a plurality of layers, based on first training data including first data D1 and first labels T1 for object task learning, similarly to a conventional neural network. For example, in the case where there are a plurality of object tasks such as "detect cat", "detect mountain" and "detect automobile", a dataset respectively allocated first data D1 for the respective object tasks and first labels T1 corresponding to the respective first data D1 serves as the first training data.

The information processing apparatus according to the embodiment is also provided with a second neural network N2 that is constituted by one or more layers L selected from the layers L constituting the first neural network. The information processing apparatus according to the embodiment derives a gradient (hereinafter, second gradient) for each weight of each layer L in the second neural network N2, based on second training data including second data D2 and second labels T2 for watermark detection. Note that, in the second training data, each second data D2 is paired with a second label T2 corresponding thereto. The second labels T2 are watermarks. Accordingly, different pairs are used in the case of differentiating the watermark to be embedded. FIG. 5 shows an example in the case where a second layer L2 in the first neural network N1 is selected as a layer constituting the second neural network N2.

As will be discussed in detail later, the information processing apparatus according to the embodiment expands the weight filter of the layer L (second layer L2 in this example) selected from the first neural network N1 in one dimension and generates a weight updating vector W. The information processing apparatus according to the embodiment performs a predetermined computation on the second data D2 for watermark detection and the generated weight updating vector W to derive a second output O2, which is the output of the second neural network N2. For example, assume that the weight updating vector W is a vector including K weights, and the second label T2 consists of B bits. In this case, the second data D2 can be regarded as a matrix consisting of B rows and K columns. The second neural network N2 then derives the product of this matrix and the weight updating vector W, and derives a B-bit second output O2. Note that the values of elements of the matrix consisting of B rows and K columns and the values of the respective bits of the second label T2 can be arbitrarily selected. The information processing apparatus according to the embodiment derives a second gradient for each weight of the weight updating vector by the error backpropagation method, based on a second error E2 between the second output O2 and the second label T2.

Here, the information processing apparatus according to the embodiment sets mask data M with respect to the weight updating vector W in the second neural network N2. The mask data M indicates, for each weight of the weight updating vector W, whether to forcibly set the second gradient to 0 or whether to derive the second gradient. In other words, the mask data is data indicating whether each of the weights of the weight updating vector W belongs to a first group or belongs to a second group. Here, weights belonging to the first group are weights for which the second gradient is derived, and weights belonging to the second group are weights for which the second gradient is not derived (or for which the second gradient is forcibly set to 0). In the example shown in FIG. 5, the portions indicated by a black rectangle with a white X mark in the mask data M are where the second gradient is not derived.

The information processing apparatus according to the embodiment sets mask data M in which weight updating is prohibited in different places, in the case where the second labels T2 for watermark detection differ, that is, in the case where the watermarks to be embedded differ. The information processing apparatus according to the embodiment is thereby able to embed different watermarks equivalent in number to the number of different mask data in the one or more layers selected from the layers constituting the first neural network.

As mentioned above, with regard to the first neural network N1, the first gradient is calculated for all the weights of all the layers based on the first training data. Also, the second gradient is derived based on the second neural network N2 and the second training data, for weights indicated by the mask data M as belonging to the first group, among the plurality of weights of the layer L2 selected as a layer constituting the second neural network N2. The information processing apparatus according to the embodiment updates weights for which only the first gradient was derived, among the weights of each layer L of the first neural network N1, using only the first gradient. On the other hand, the information processing apparatus according to the embodiment updates weights for which the first gradient and the second gradient were derived, among the weights of the layer selected as a layer constituting the second neural network from the plurality of layers of the first neural network N1, based on the first gradient and the second gradient, or more specifically, based on the sum of the first gradient and the second gradient. The information processing apparatus according to the embodiment, upon updating the weights of each layer L of the first neural network N1, derives the weight updating vector W of the second neural network N2 again, based on the updated weights. The information processing apparatus according to the embodiment simultaneously realizes learning for an object task and learning for watermark embedding, by deriving the weight updating vector W of the second neural network N2, and repeatedly calculating the first gradient, calculating the second gradient, and updating the weights of the first neural network N1. Note that a configuration can be adopted in which, after initially deriving the weight updating vector W of the second neural network N2, the weights of the weight updating vector W are also updated based on the sum of the second gradient derived for these weights and the first gradient derived for these weights in the first neural network N1. In this case, the information processing apparatus according to the embodiment repeatedly calculates the first gradient, calculates the second gradient, and updates the weights of the first neural network N1 and the second neural network N2. Note that, hereinafter, the former method will be adopted; that is, only the weights of the first neural network N1 are updated, and the weight updating vector W of the second neural network N2 is derived again after the updating. Note that, in this case, the layer (second layer L2 in this example) of the first neural network that serves as the basis of the weight updating vector W of the second neural network N2 is assumed to be the same throughout the repetitions.

Figure 6:
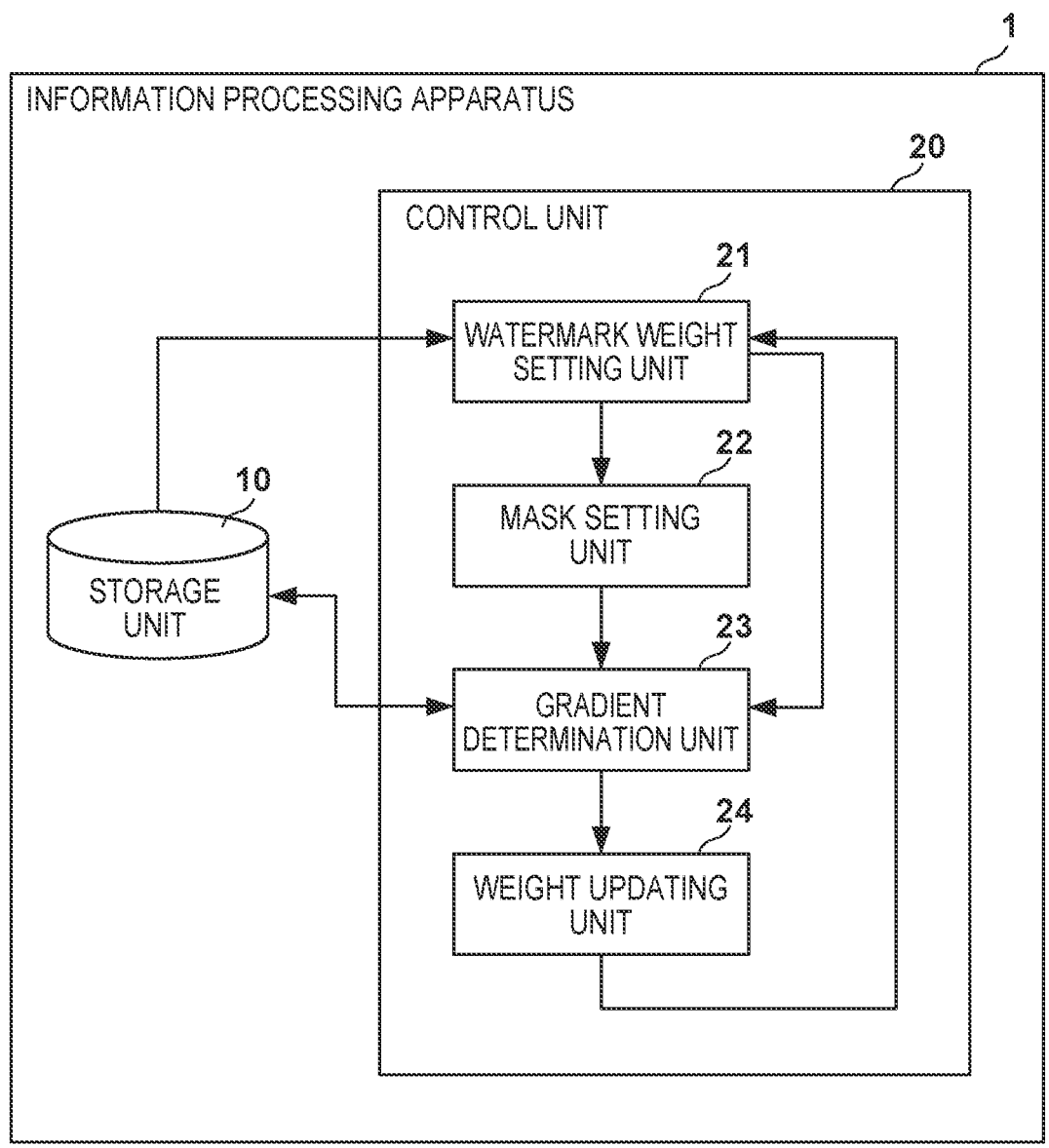
FIG. 6 is a diagram showing a functional configuration of the information processing apparatus according to an embodiment.

Functional Configuration of Information Processing Apparatus according to Embodiment Hereinafter, the information processing apparatus according to the embodiment will be described in detail. FIG. 6 is a diagram schematically showing a functional configuration of an information processing apparatus 1 according to the embodiment. The information processing apparatus 1 is provided with a storage unit 10 and a control unit 20. The control unit 20 is provided with a watermark weight setting unit 21, a mask setting unit 22, a gradient determination unit 23, and a weight updating unit 24.

The storage unit 10 is a ROM (Read Only Memory) that stores a BIOS (Basic Input Output System) of a computer that realizes the information processing apparatus 1, and the like, a RAM (Random Access Memory) serving as a work area of the information processing apparatus 1, or a mass storage device such as an HDD or SSD that stores an OS (Operating System), application programs, and various information that is referred to at the time of execution of the application programs. The storage unit 10 holds the first training data, the second training data, and information indicating the configuration of the first neural network N1, being information such as initial values of the weight filters of the first neural network N1, for example.

The control unit 20 is a processor such as a CPU or GPU of the information processing apparatus 1, and functions as the watermark weight setting unit 21, the mask setting unit 22, the gradient determination unit 23 and the weight updating unit 24 by executing programs stored in the storage unit 10.

The watermark weight setting unit 21 sets the weights of the one or more layers L selected from the layers L constituting the first neural network N1 as the weights of the layers L constituting the second neural network N2 for watermark embedding tasks. Here, the watermark weight setting unit 21 preferentially selects layers L that are close to the input layer L of the first neural network N1 from the one or more layers L constituting the first neural network N1. Even supposing the learning model generated by the information processing apparatus 1 according to the embodiment is subsequently modified by fine tuning, the possibility that the layers L in which a watermark is embedded will be changed can thereby be reduced. This is, generally, because the probability of the learning model being modified by fine tuning increases the closer the layers L are to the output layer.

Figure 7:
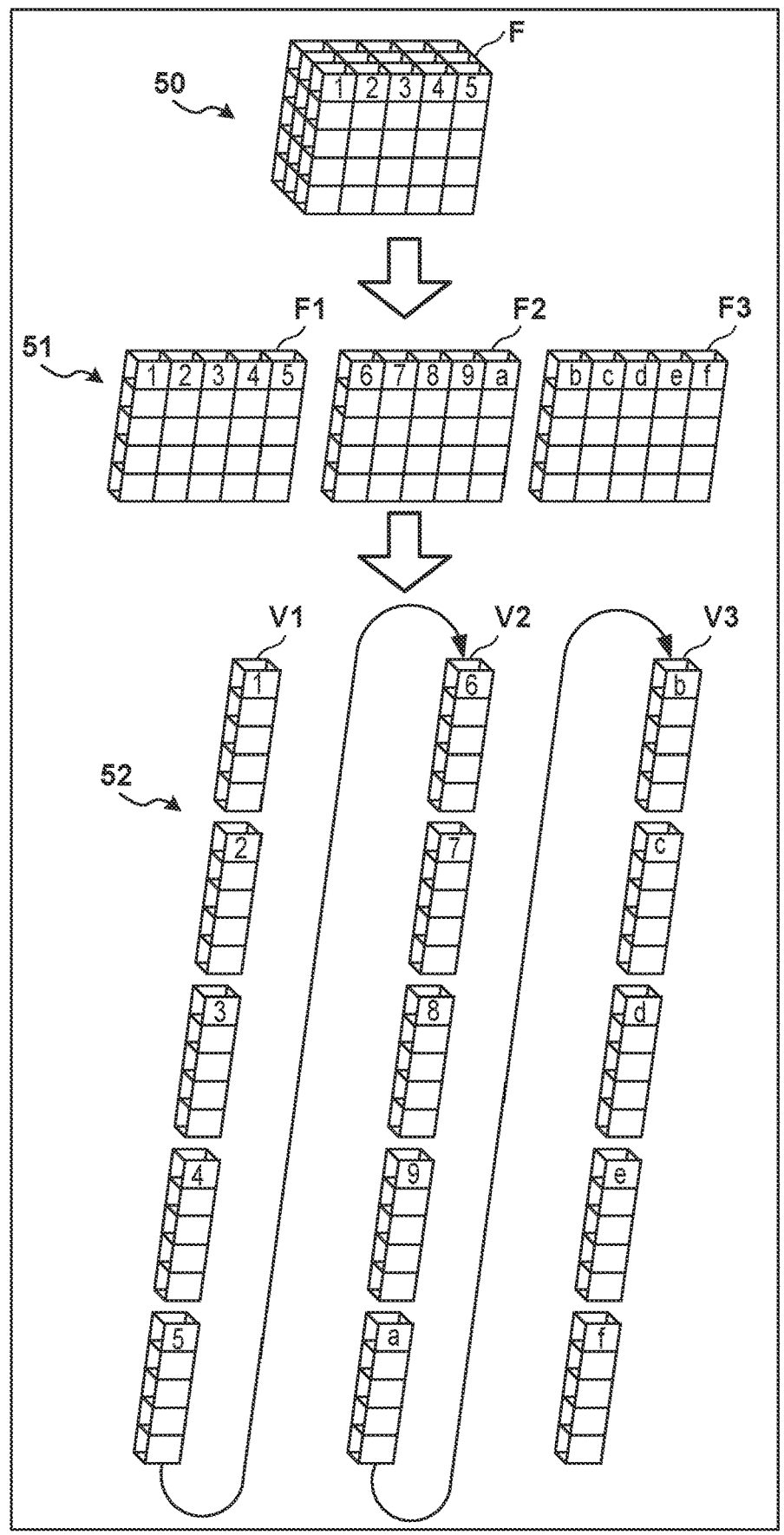
FIG. 7 is a diagram for describing weight setting processing by a watermark weight setting unit according to an embodiment.

FIG. 7 is a diagram for describing weight setting processing by the watermark weight setting unit 21 according to the embodiment. Specifically, FIG. 7 shows a process in which the watermark weight setting unit 21 generates the weight updating vector W, based on a weight filter composed of 5×5×3 elements.

Reference numeral 50 denotes a weight filter F composed of 5×5×3 elements. The watermark weight setting unit 21 divides the weight filter composed of 5×5×3 elements into three two-dimensional weight filters (F1, F2 and F3) composed of 5 vertical and 5 horizontal elements for a total of 25 elements. Reference numeral 51 denotes the first weight filter F1, the second weight filter F2, and the third weight filter F3 obtained by dividing the weight filter composed of 5×5×3 elements.

Next, the watermark weight setting unit 21 respectively expands the first weight filter F1, the second weight filter F2 and the third weight filter F3 into three column vectors (V1, V2 and V3) composed of 5×5=25 elements. Reference numeral 52 denotes a diagram schematically showing the first column vector V1, the second column vector V2 and the third column vector V3 obtained by respectively expanding the first weight filter F1, the second weight filter F2 and the third weight filter F3.

Finally, the watermark weight setting unit 21 generates one column vector V composed of 25×3=75 elements by connecting the first column vector V1, the second column vector V2 and the third column vector V3 in order, and sets the generated column vector V as the weight updating vector W. Here, in the case where a layer L selected by the watermark weight setting unit 21 is provided with N weight filters N, as described with reference to FIG. 4, the watermark weight setting unit 21, after having similarly expanded each filter into column vectors, connects these column vectors in order and generates a new column vector composed of 75×N elements. The watermark weight setting unit 21 sets the generated column vector as the weight updating vector W.

Figure 8A:
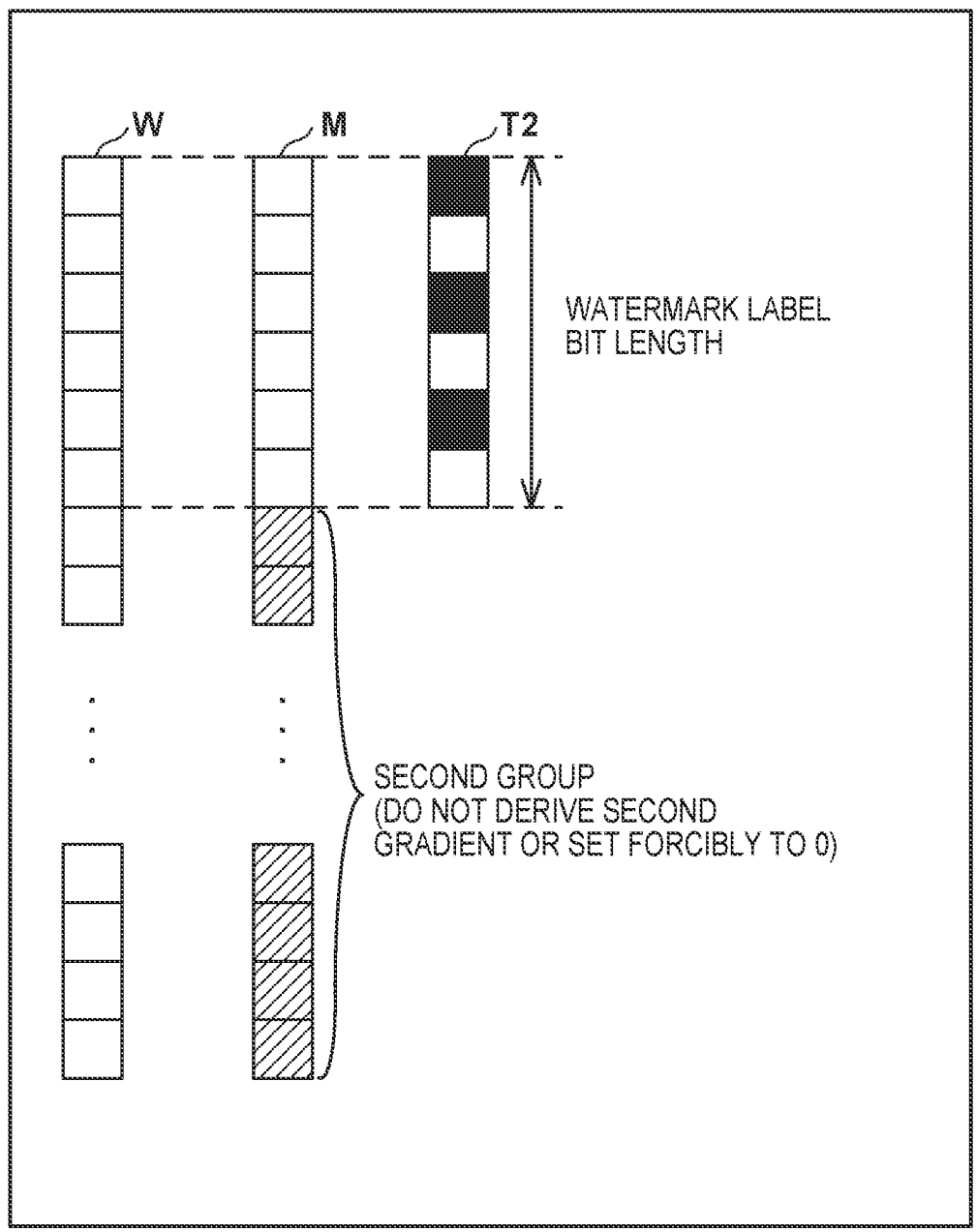
FIG. 8A is a diagram showing a relationship between a weight updating vector, mask data and a second label according to an embodiment.

The mask setting unit 22 sets the mask data M. FIG. 8A shows the relationship between the weight updating vector W, the mask data M, and the second label T2. As shown in FIG. 8A, the shape and size of the mask data M are the same as the weight updating vector W. In the weight updating vector W shown in FIG. 8A, one rectangle indicates one weight.

In the mask data M, the white rectangles indicate that the corresponding weight belongs to the first group, and the shaded rectangles indicate that the corresponding weight belongs to the second group. Note that the weights of the first group are weights for which the second gradient is derived, and the weights of the second group are weights for which the second gradient is not derived or is forcibly set to 0. Note that the number of weights belonging to the first group is assumed to be same as the bit count of the second label T2, for example. In the example shown in FIG. 8A, the six weights of the upper part of the weight updating vector W will be updated based on the sum of the second gradient and the first gradient for the corresponding weights of the first neural network. On the other hand, the weights other than the six weights of the upper part of the weight updating vector W will be updated based on only the first gradient for corresponding weights of the first neural network, since the second gradient is either not derived or forcibly set to 0 for these other weights. The bit length of the second label T2 need only be determined with consideration for the length of the weight updating vector W, the number of watermarks to be embedded, the complexity of watermark data, and the like.

Figure 8B:
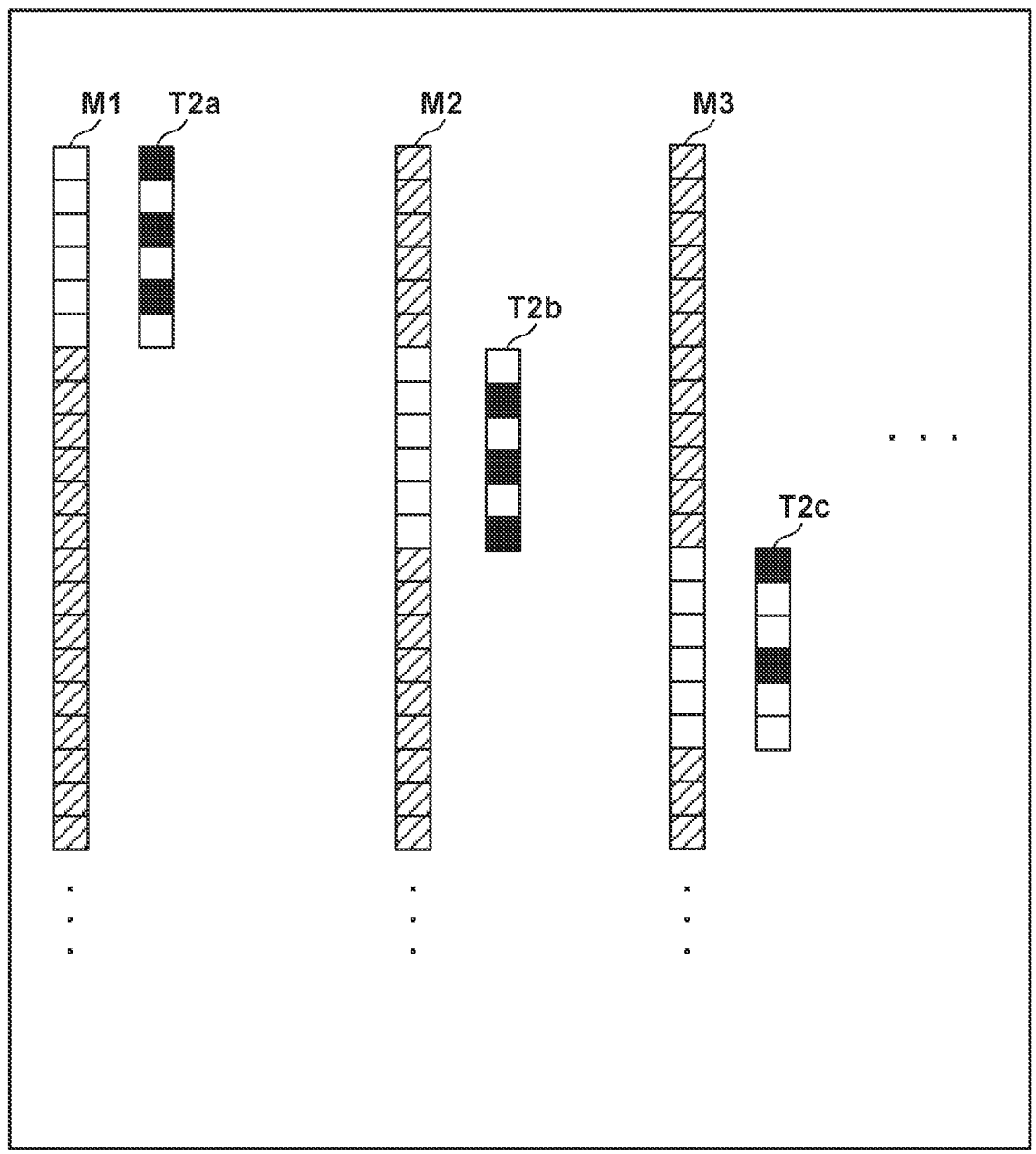
FIG. 8B is a diagram showing a relationship between mask data and second labels according to an embodiment.

FIG. 8B is a diagram showing three different mask data M and three different second labels T2 corresponding thereto. More specifically, FIG. 8B shows first mask data M1, second mask data M2 and third mask data M3, and second label T2a, second label T2b and second label T2c corresponding to the respective mask data M. In this way, the mask setting unit 23 sets different mask data M when the second training data differs. As shown in FIG. 8B, the weights of the first group that are indicated by the first mask data M1, the second mask data M2 and the third mask data M3 do not overlap. The mask setting unit 22 sets different mask data M, when learning different second labels T2 (i.e., different second data D2 for watermark detection). According to this configuration, first the second label T2a is embedded in the first neural network N1, and, thereafter, the second label T2b can be embedded, when the version of the first neural network N1 is updated.

The gradient determination unit 23 derives the first gradient based on the first training data for each weight of all the layers of the first neural network N1. Also, the gradient determination unit 23 derives the second gradient for weights indicated by the mask data as belonging to the first group, within the weight updating vector W of the second neural network N2. Alternatively, the gradient determination unit 23 derives the second gradient for each weight of the weight updating vector W of the second neural network N2, and, thereafter, forcibly sets the second gradient to 0 for the weights of the second group. The weight updating unit 24 updates the weights for which only the first gradient was derived, among the weights of the plurality of layers of the first neural network N1, based on the first gradient. On the other hand, the weight updating unit 24 updates the weights for which both the first gradient and the second gradient were derived, among the weights of the plurality of layers of the first neural network N1, based on the first gradient and the second gradient. The updated weights of the first neural network N1 are notified to the watermark weight setting unit 21, and the watermark weight setting unit 21 generates the weight updating vector W based on the updated weights of the first neural network N1. Subsequently, this processing is repeated. Note that, in the repetition, the processing by the watermark weight setting unit 21 and the mask setting unit 22 is the same. In other words, the layer of the first neural network N1 that is used in order for the watermark weight setting unit 21 to generate the weight updating vector W and the method of expanding this layer into the weight updating vector W are the same. Also, the mask data M that is generated by the mask setting unit 22 is the same.

Here, the gradient determination unit 23 may forcibly set the first gradient for weights of the first neural network N1 corresponding to weights of the weight updating vector W that are indicated by the mask data M as belonging to the first group to 0 (or not derive the first gradient). In this case, the weights of the first neural network N1 whose first gradient is forcibly set to 0 (or whose first gradient is not derived) will be updated using only the second gradient, and will, therefore, be used only for embedding watermarks, and will not contribute to learning the object task. Although the learning ability of the first neural network N1 will be reduced by the reduction in weights contributing to learning the object task, it is thought that there will be little substantive influence on the object task, as long as there is a sufficient number of layers on the output side of the layer L selected by the watermark weight setting unit 21. On the contrary, those weights will be allocated exclusively for embedding watermarks, enabling the reliability of watermark embedding to be improved.

Also, the second output O2, which is the output of the second neural network N2, was given as being derived by performing a predetermined computation on the second data D2 for watermark detection and the generated weight updating vector W. At this time, a configuration can be adopted in which the computation with the second data D2 is performed for weights of the weight updating vector W that are indicated by the mask data M as belonging to the second group, assuming that the value of these weights is 0. In this case, the computation with the second data D2 is also performed with the weights of the second group set to 0, when deriving the second gradient. The weights of the second group are updated using only the first gradient, and do not contribute to generation of the second label T2. Accordingly, the second output O2 can be approximated to the second label T2, by performing the computation with the weights of the second group set to 0.

Processing Flow of Information Processing executed by Information Processing Apparatus 1

Figure 9:
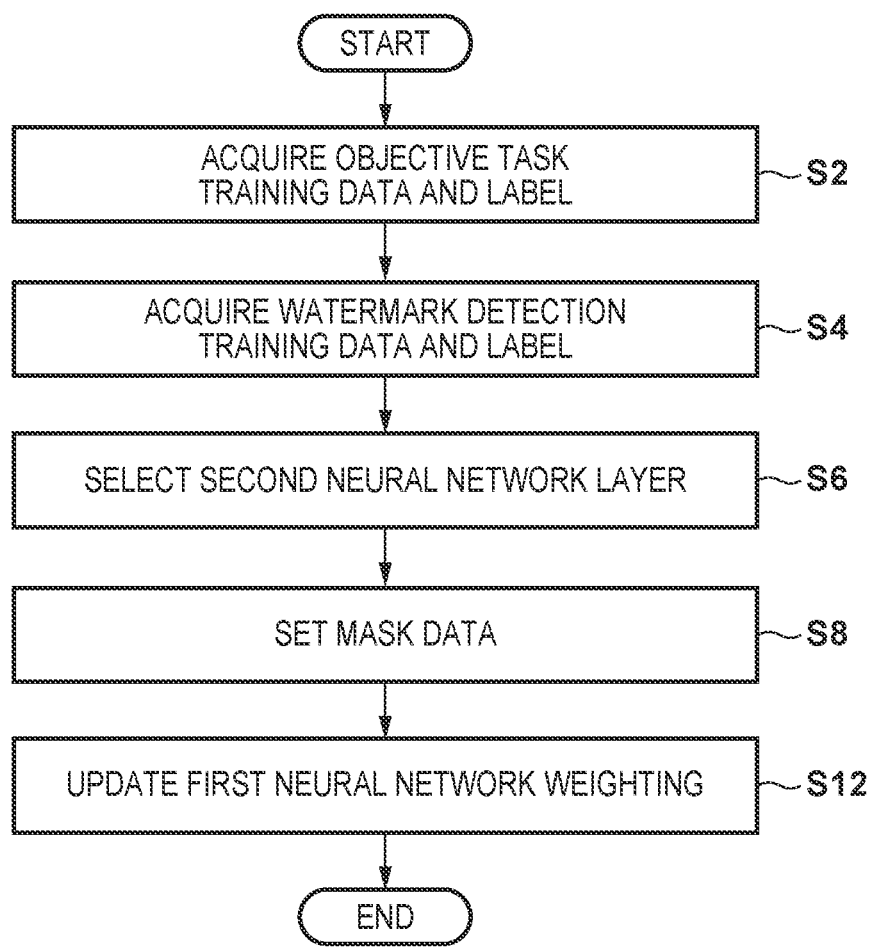
FIG. 9 is a flowchart of information processing that is executed by the information processing apparatus according to an embodiment.

FIG. 9 is a flowchart for describing the flow of information processing that is executed by the information processing apparatus 1 according to the embodiment. The processing of this flowchart starts when the information processing apparatus 1 starts up, for example.

The control unit 20 reads out and acquires the first data D1 and first label T1 for object task learning from the storage unit 10 (S2). The control unit 20 reads out and acquires the second data D2 and second label T2 for watermark detection from the storage unit 10 (S4).

The watermark weight setting unit 21 selects the weights of the one or more layers L selected from the layers L constituting the first neural network N1 as weights of a layer L constituting the second neural network N2 for watermark embedding tasks (S6). The mask setting unit 22 sets the mask data M (S8).

The gradient determination unit 23 derives the second gradient for weights of the first group of the weight updating vector W, so as to minimize the second error E2, which is the error between the output of the second neural network N2 and the label for watermark detection. Furthermore, the gradient determination unit 23 derives the first gradient for each weight of the first neural network N1, so as to minimize the first error E1, which is the error between the output of the first neural network N1 and the first label T1. The weight updating unit 24 updates the respective weights of the plurality of layers of the first neural network N1, as described above (S12).

The information processing apparatus 1 repeats the processing of FIG. 9 until the first error E1 and the second error E2 both decrease to less than or equal to respective predetermined thresholds. The processing of this flowchart ends when the first error E1 and the second error E2 both decrease to less than or equal to the predetermined thresholds.

Effects Achieved by Information Processing Apparatus 1

The information processing apparatus 1, for example, generates the weight updating vector W as described with FIG. 7 from weight filters being used by a certain neural network, and performs a predetermined computation defined by the second neural network N2 on this weight updating vector W and the second data D2 to derive the second output O2. The origin of the certain neural network can be specified by comparing this second output O2 and the second label T2. Specifically, it can be determined that the neural network has the second label T2, which is a watermark, embedded therein, when the differences between corresponding elements of the second output O2 and the second label T2 are all less than or equal to a threshold, for example. Also, because the mask setting unit 22 sets the mask data M in association with second training data including the second data D2 and second label T2 for watermark detection, a plurality of watermark data can be embedded. Watermarks that differ for every version or rights holder of a learning model can thereby be inserted in the learning model, for example.

Also, although supervised learning was described above as the object task, learning may be performed by applying the technique of the present invention in learning methods other than supervised learning (e.g., reinforcement learning, unsupervised learning, semi-supervised learning, etc.) as the object task.

The present invention is not limited to the above embodiment and various changes and modifications can be made within the spirit and scope of the present invention. Accordingly, to apprise the public of the scope of the present invention, the following claims are made.

The invention claimed is:

1. An information processing apparatus comprising:
at least one processor circuit with a memory comprising instructions, that when executed by the processor circuit, causes the at least one processor circuit to at least:
set a plurality of weights of a selection layer selected from a plurality of layers of a first neural network as a plurality of weights of a second neural network;
classify each of the plurality of weights of the selection layer into a first group or a second group;
determine a first gradient for each weight of the plurality of layers of the first neural network, based on first training data;
determine a second gradient for weights belonging to the first group among the plurality of weights of the second neural network, based on second training data; and
update the weights belonging to the first group, among the plurality of weights of the selection layer, based on the first gradient and the second gradient and updating the weights belonging to the second group, among the plurality of weights of the selection layer, and weights of the layers other than the selection layer among the plurality of layers of the first neural network, based on the first gradient;
wherein each of the plurality of weights of the selection layer into the first group or the second group is classified according to the second training data; and
the weights of the selection layer that are shown by the first group do not overlap with respect to different pieces of the second training data.

2. The information processing apparatus according to claim 1,
wherein the first gradient is set to 0 for the weights belonging to the first group, among the plurality of weights of the selection layer of the first neural network.

3. The information processing apparatus according to claim 1,
wherein a layer close to an input layer of the first neural network is preferentially selected, among the plurality of layers of the first neural network, as the selection layer.

4. The information processing apparatus according to claim 1,
wherein the second gradient is determined for the weights belonging to the second group, among the plurality of weights of the second neural network, with a value of said weights set to 0.

5. An information processing method according to which a processor having a memory executes:
selecting a selection layer from a plurality of layers of a first neural network;
setting the selection layer as a layer constituting a second neural network;
classifying each of a plurality of weights of the selection layer into a first group or a second group;
determining a first gradient for each weight of the plurality of layers of the first neural network, based on first training data;
determining a second gradient for weights belonging to the first group, among the plurality of weights of the selection layer constituting the second neural network, based on second training data; and
updating the weights belonging to the first group, among the plurality of weights of the selection layer, based on the first gradient and the second gradient, and updating the weights belonging to the second group, among the plurality of weights of the selection layer, and weights of the layers other than the selection layer among the plurality of layers of the first neural network, based on the first gradient wherein each of the plurality of weights of the selection layer into the first group or the second group is classified according to the second training data; and
the weights of the selection layer that are shown by the first group do not overlap with respect to different pieces of the second training data.

6. A non-transitory computer-readable storage medium storing a program, the program, when executed by one or more processors, causing the one or more processors to execute:
selecting a selection layer from a plurality of layers of a first neural network;
setting the selection layer as a layer constituting a second neural network;
classifying each of a plurality of weights of the selection layer into a first group or a second group;
determining a first gradient for each weight of the plurality of layers of the first neural network, based on first training data;
determining a second gradient for weights belonging to the first group, among the plurality of weights of the selection layer constituting the second neural network, based on second training data; and
updating the weights belonging to the first group, among the plurality of weights of the selection layer, based on the first gradient and the second gradient, and updating the weights belonging to the second group, among the plurality of weights of the selection layer, and weights of the layers other than the selection layer among the plurality of layers of the first neural network, based on the first gradient;
wherein each of the plurality of weights of the selection layer into the first group or the second group is classified according to the second training data; and
the weights of the selection layer that are shown by the first group do not overlap with respect to different pieces of the second training data.

* * * * *